J. HICKS.
STAIRWAY TRAP.
APPLICATION FILED MAY 18, 1920.

1,380,295.

Patented May 31, 1921.
3 SHEETS—SHEET 1.

J. Hicks INVENTOR

BY Victor J. Evans
ATTORNEY

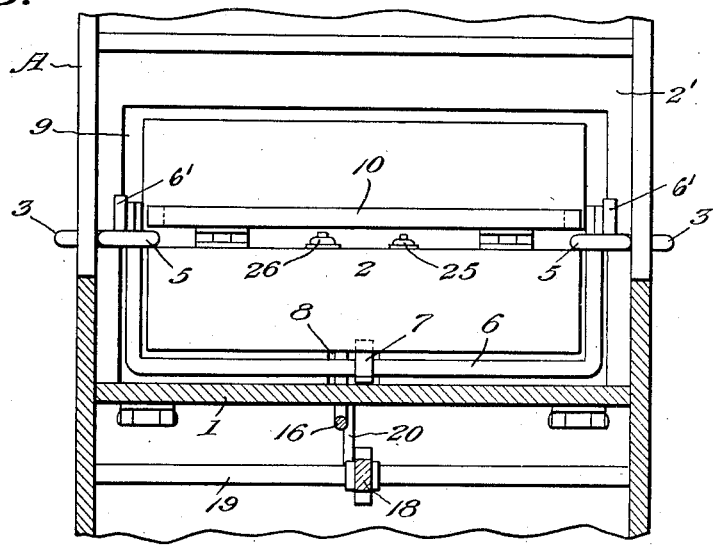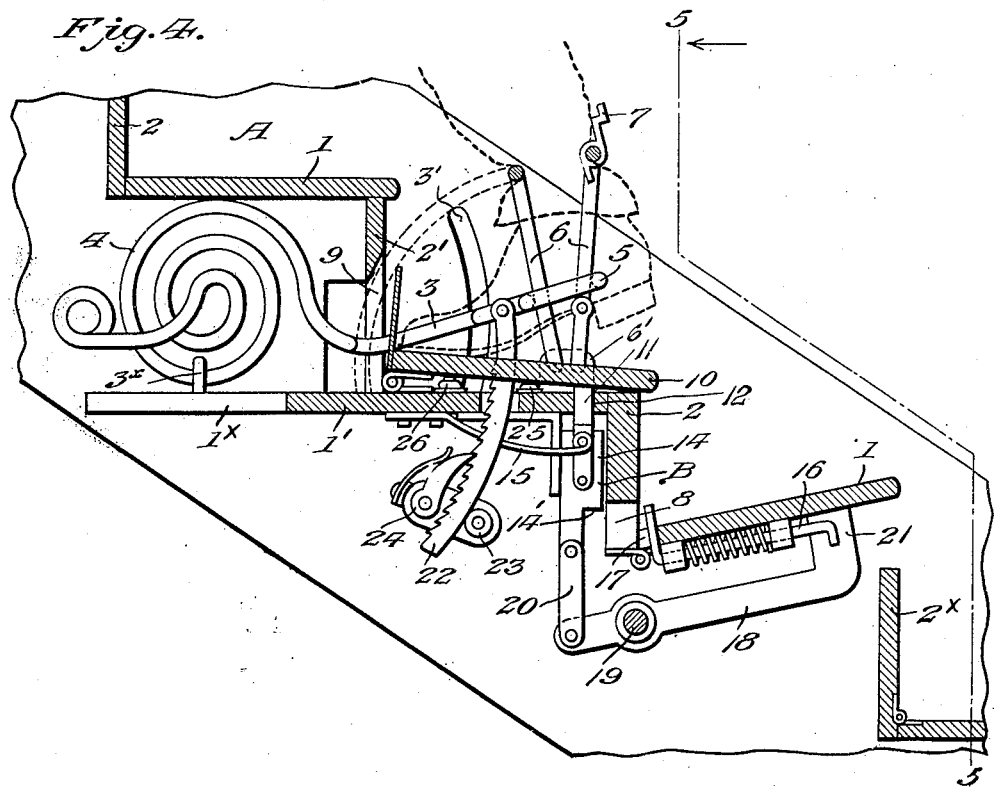

J. HICKS.
STAIRWAY TRAP.
APPLICATION FILED MAY 18, 1920.

1,380,295.

Patented May 31, 1921.
3 SHEETS—SHEET 3.

Edwin F. McKee
L. B. Middleton
WITNESS:

J. Hicks INVENTOR
BY Victor J. Evans
ATTORNEY

UNITED STATES PATENT OFFICE.

JEREMIAH HICKS, OF PHILADELPHIA, PENNSYLVANIA.

STAIRWAY-TRAP.

1,380,295.  Specification of Letters Patent.  Patented May 31, 1921.

Application filed May 18, 1920. Serial No. 382,386.

*To all whom it may concern:*

Be it known that I, JEREMIAH HICKS, a citizen of the United States, residing at Philadelphia, in the county of Philadelphia and State of Pennsylvania, have invented new and useful Improvements in Stairway-Traps, of which the following is a specification.

This invention relates to burglar traps and the principal object of the invention is to conceal the trap on a stairway and to provide means whereby the trap will be sprung by a person walking up the stairs and his foot will be seized by the jaws of the trap.

Another object of the invention is to provide means for locking the jaws of the trap in closed position so that it will be impossible for the burglar to release himself by his hands.

Still another object of the invention is to provide means for preventing a person from springing the trap while standing on a step below the one on which operates the trigger.

Another object of the invention is to so arrange the parts of the trap that they may be concealed by strips of paper or the like which will be broken by the jaws of the trap when the trap is sprung.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Fig. 3 is a section on line 3—3 of Fig. 2.

Fig. 4 is a view similar to Fig. 2 but showing the parts in sprung position.

Figure 1:
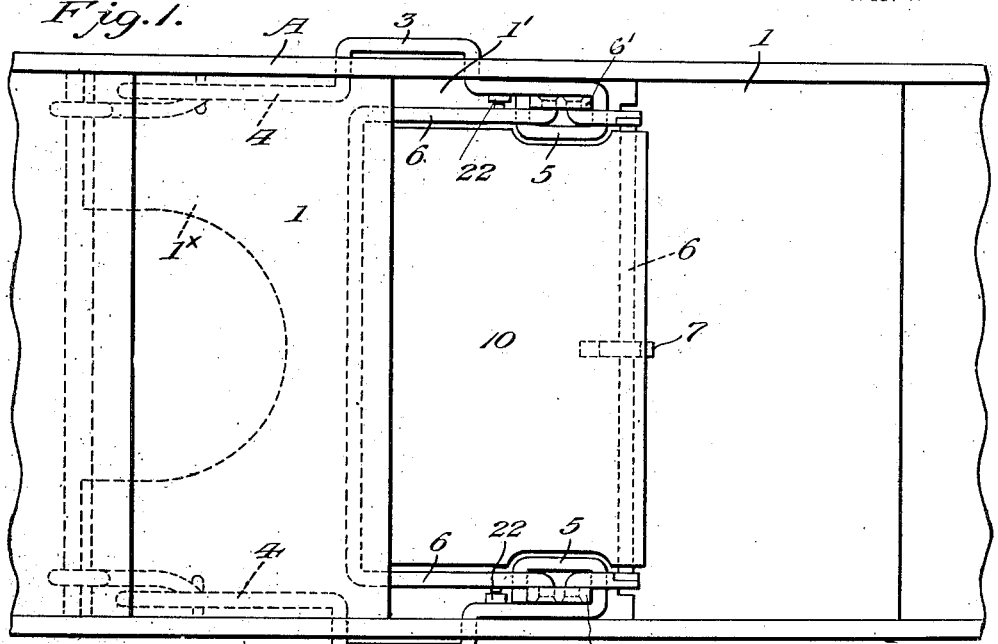
Figure 1 is a plan view of a portion of a stairway, which is supplied with my invention.
Figure 2:
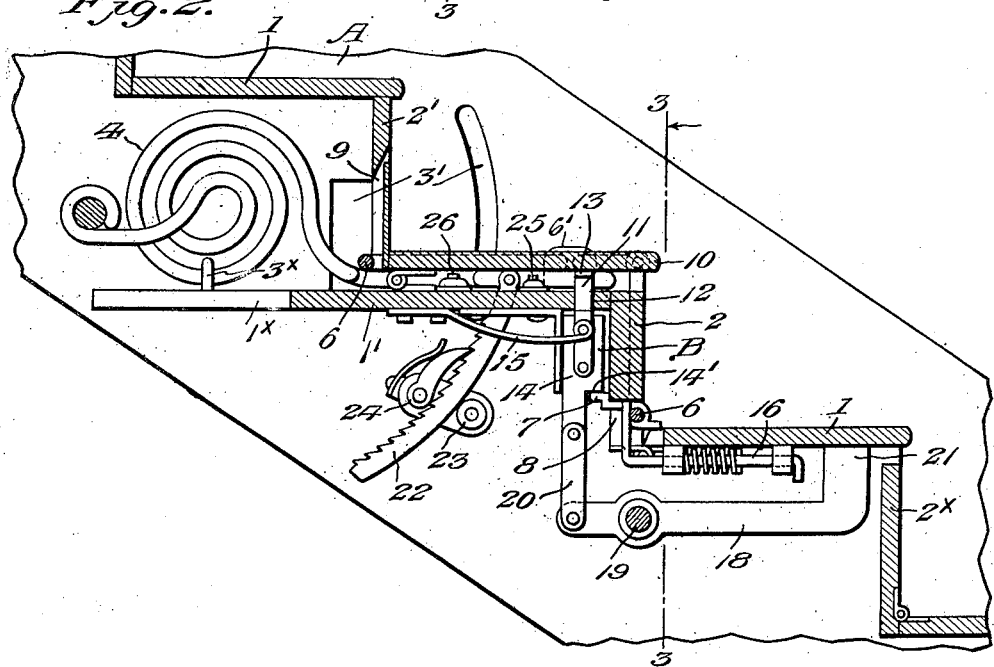
Fig. 2 is a longitudinal sectional view through Fig. 1 showing the parts in set position.
Figure 5:
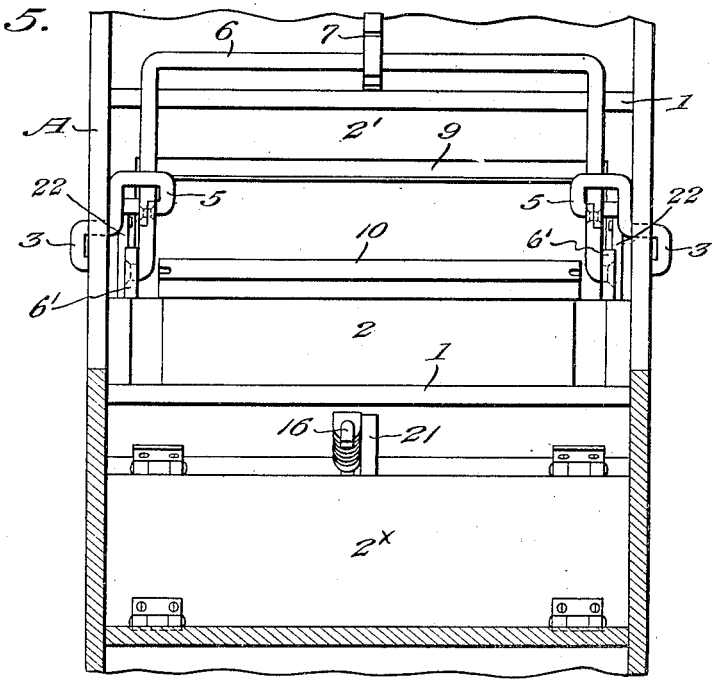
Fig. 5 is a section on line 5—5 of Fig. 4.
Figure 6:
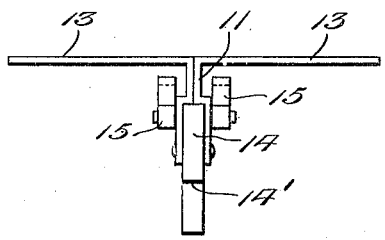
Fig. 6 is a detail view of the trigger.

In these views A indicates the stairway which comprises the steps 1 and risers 2. One of these steps as indicated at 1', is provided with a rear extension $1^x$ which is of fork shape as shown and supports the arms 3 which have their rear extremities coiled to provide the springs 4. These springs are held by staples $3^x$ to the rear extension $1^x$. The front portions of these arms are bowed and pass through openings 3' in the sides of the stairway and the front ends are looped as at 5 to engage the jaws 6 of the trap. These jaws are pivoted to the blocks 6' on step 1' at its ends and these spring arms tend to hold the jaws in closed position as shown in Fig. 4. One of these jaws has each of its end portions formed in sections with the sections pivoted together so that this jaw may be swung with the end sections parallel with the step 1' and the rest of the jaws extending at rightangles along the face of the riser under said step. This jaw is provided with a hook 7 which is adapted to pass through a hole 8 in said riser with its hooked part engaging the underface of the riser so that the jaws will be held in open position against the action of the springs as shown in Fig. 2. The riser 2' which is located above the step carrying the trap is provided with a substantially U-shaped slot 9 to receive the other jaw of the trap when the trap is open. This jaw when open, lies along the upper face of the step 1' and extends through the slot in the riser under the stairs. This slot is so formed that when the trap is sprung the inner jaw 6 will pass therethrough. The step 1' is covered by a trigger plate 10 which is hinged at its rear edge to said step. This plate is adapted to operate the trigger B which consists of the rod 11 which passes through a hole 12 in the step 1' and above the step the rod is provided with the rightangular extending arms 13 which lie between the plate and step. The rod 11 is connected with the trigger block 14 which is pivotally connected with the spring arms 15, secured to the under face of the step 1'. These arms press the trigger upwardly so that the arms 13 will hold the trigger plate raised above the step 1'. The trigger block is provided with a shoulder 14' for engaging the hook 7 and forcing the same downwardly when the trigger is depressed by a person stepping on the trigger plate. This downward movement will disengage the hook so that it may pass through the opening 8.

In order to insure the releasing of this hook from the hole and the swinging of the jaw outwardly I provide a spring plunger 16 secured to the underface of the step which is below the step 1'. This plunger has its end bent upwardly and passes through a slot 17 formed in said step and this upwardly extending end is adapted to engage the jaw and when the jaw is held by its hook the spring plunger will be compressed. Thus when the hook is released the plunger will spring forwardly and pull the jaw and its hook outwardly, releasing the hook from the hole and permitting the jaw to swing upwardly against the action of the spring arms.

In order to prevent a person standing on the lower step from springing the trap by pressing the trap plate I provide means for holding the trigger against movement when the lower step is occupied. Such means consists of a member 18 pivoted by the rod 19 and having one end connected with the trigger block by the link 20 and its other end provided with an offset portion 21, which is connected with the underface of the lower step. This lower step is also hinged at its inner edge so that it may have limited swinging movement. The weight of the step normally holds it in its lowest position and when a person is standing on this step the trigger cannot be lowered to release the hook of the jaw as the member 18 connecting the step with said trigger will prevent downward movement of said trigger. However, if the lower step is unoccupied and the trigger plate stepped upon the downward movement of the trigger will cause the member 18 to rock on its pivot and raise the lower step.

In order to lock the jaws in closed position and prevent the burglar from opening the same with his hands I provide rack bars 22 for the spring arms. These rack bars have their upper ends pivoted to the arms and pass through suitable openings in the step 1'. Guiding members 23 are located under the steps and these members engage the rack bars and carry dogs 24 for engaging the teeth of the racks. These dogs are arranged to permit upward movement of the racks but not to permit downward movement thereof so that when the jaws are closed it is necessary to release the dogs from the rack before the jaw can be opened again.

In setting the trap the spring arms are lowered so as to permit the jaws to open one jaw being pressed down through the front riser and the other jaw being bent down along the riser of the rear stair and its hook passing through the opening in said riser and its hooked end placed in engagement with the rear face of said rod. This will hold the jaws open against the action of the spring arms. The riser $2^x$ which is below the lower step is hinged so that it may be swung open to permit access to the parts under the steps so that the dogs may be released from the racks to permit the jaws to be opened.

After the trap is set the slot 9 and the openings through which the spring arms pass are covered with paper or the like which is of the same color as the stairs so that said openings will be hidden from view.

If a burglar should attempt to pass up the stairway he would step upon the trigger plate thus forcing the trigger downwardly and pushing the hook on the jaw out of engagement with the hole. The spring plunger would then force the hook out of the hole and the jaw outwardly away from the riser. The spring arms would then bring the jaws together the upper jaw passing through the slot in the upper riser breaking the papers as it strikes same. Thus the foot of the burglar would be seized by the jaws and he would be prevented from opening the jaws by his hands on account of the dogs engaging the rack bars. Thus the burglar would be securely held until released and before he could be released the hinged riser would have to be unlocked and the dogs disengaged from the racks.

I may place an electric push button 25 on the step 1' and connect this with an alarm in a police station so that when the trigger plate is depressed the alarm would be sounded in the station and notify the police authorities of the capture. I may also connect a push button 26 on said step with an electric lamp at the entrance of the dwelling so as to notify the householder of the capture before he enters the dwelling.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a stairway, a pair of trap jaws connected with one of the steps thereof, spring arms engaging said jaws and connected with a part of the stairway, a trigger plate hinged to the step carrying the jaws, means engaging a part of the stairway for holding the jaws in open position and a trigger actuated by the trigger plate for releasing such means.

2. In combination with a stairway, a trap connected with one of the steps thereof and consisting of a pair of jaws and spring means for holding the jaws in closed position, one of the risers of the stairway having an opening therein, a hook on one of the jaws for engaging said opening to hold the jaws in open position, a trigger plate hinged to the step carrying the trap, a trigger actuated by said plate and having a part for engaging the hook for releasing the same when the plate is depressed.

3. In combination with a stairway, a trap connected with one of the steps thereof and consisting of a pair of jaws and spring means for holding the jaws in closed position, one of the risers of the stairway having an opening therein, a hook on one of the jaws for engaging said opening to hold the jaws in open position, a trigger plate hinged to the step carrying the trap, a trigger actuated by said plate and having a part for engaging the hook for releasing the same when the plate is depressed and means for preventing movement of the trigger when the lower step is occupied.

4. In combination with a stairway, openings in one of its steps and risers, a trap supported by one of the steps and consisting of a pair of jaws with spring means for holding the jaws in closed position, one of said jaws passing through the opening in one of the risers, a hook on the other jaw for engaging an opening in one of the other risers for holding the jaws in open position, a hinged trigger plate on the step carrying the trap, a trigger under the stairway, consisting of a trigger block and a rod connected with the block and passing through the step and engaging the underface of the trigger plate, spring means for holding the trigger and plate in raised position, said block having a shoulder thereon for engaging the hook when the plate is depressed and means for locking the jaws in closed position.

5. In combination with a stairway, openings in one of its steps and risers, a trap supported by one of the steps and consisting of a pair of jaws with spring means for holding the jaws in closed position, one of said jaws passing through the opening in one of the risers, a hook on the other jaw for engaging an opening in one of the other risers for holding the jaws in open position, a hinged trigger plate on the step carrying the trap, a trigger under the stairway, consisting of a trigger block and a rod connected with the block and passing through the step and engaging the underface of the trigger plate, spring means for holding the trigger and plate in raised position, said block having a shoulder thereon for engaging the hook when the plate is depressed and means for locking the jaws in closed position, such means comprising rack bars connected with the spring means of the trap and extending under the stairway and dogs engaging said rack bars and preventing the downward movement of said bars.

6. In combination with a stairway, having a hinged step and a hinged riser and openings in some of said steps and risers, a trap carried by one step and consisting of a pair of jaws with spring means for normally holding the jaws closed, a hook on one jaw for engaging an opening in one of the risers to hold the jaws in open position, a trigger plate movably connected with the step carrying the trap, a trigger located under the stairway and consisting of a trigger block and a rod passing through the step and engaging the face of the plate, said block having a shoulder thereon for engaging the hook when the plate is depressed, spring means for holding said trigger and plate in raised position and a pivoted member connecting said block with the hinged step so that the trigger cannot be moved when the step is occupied.

7. In combination in a stairway having openings in some of the steps and risers, a trap carried by one of the steps and consisting of a pair of jaws and spring means for holding the jaws closed, a block on one of the jaws engaging with an opening in a riser for holding the jaws closed, a spring plunger for engaging with said jaw to pull the same away from the riser and the hook out of its opening, a trigger for releasing said hook from the hole and a trigger plate carried by the step on which the trap is located for actuating the trigger.

8. In combination with a stairway having openings in some of its steps and risers, one of the steps having a rear extension, a trap carried by said step and consisting of a pair of jaws and spring arms, said spring arms being connected with the extension, a hook on one jaw for engaging the hole in one of the risers for holding the jaws in open position, a trigger plate movably connected with the step carrying the trap, a trigger actuated by the movement of said plate for releasing the hook from its hole, rack bars carried by said spring arms and passing below the step and spring dogs engaging said racks for preventing downward movement thereof.

9. In combination with a stairway having openings in some of its steps and risers, a trap carried by one step and having parts thereof occupying the openings when the trap is set, strips of fragile material closing said openings and covering the parts of the trap and means actuated by a person mounting the stairs for springing the trap.

In testimony whereof I affix my signature.

JEREMIAH HICKS.